United States Patent
Tang

(10) Patent No.: US 11,246,134 B2
(45) Date of Patent: Feb. 8, 2022

(54) CARRIER SELECTING METHOD, TERMINAL DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 71 days.

(21) Appl. No.: 16/647,226

(22) PCT Filed: Sep. 15, 2017

(86) PCT No.: PCT/CN2017/101855
§ 371 (c)(1),
(2) Date: Mar. 13, 2020

(87) PCT Pub. No.: WO2019/051759
PCT Pub. Date: Mar. 21, 2019

(65) Prior Publication Data
US 2020/0245327 A1 Jul. 30, 2020

(51) Int. Cl.
*H04L 12/28* (2006.01)
*H04W 72/04* (2009.01)
(Continued)

(52) U.S. Cl.
CPC ....... *H04W 72/0453* (2013.01); *H04W 72/10* (2013.01)

(58) Field of Classification Search
CPC . H04W 36/03; H04W 72/0453; H04W 92/18; H04W 72/04; H04L 5/001
(Continued)

(56) References Cited

U.S. PATENT DOCUMENTS

2015/0282163 A1* 10/2015 Stanze .................. H04L 1/1887
370/329
2016/0037503 A1 2/2016 Wu
(Continued)

FOREIGN PATENT DOCUMENTS

| CN | 1349362 A | 5/2002 |
|---|---|---|
| CN | 101136895 A | 3/2008 |

(Continued)

OTHER PUBLICATIONS

Intel Corporation,. "Sidelink Carrier Aggregation for Mode-4 LTE V2V Communication," 3GPP TSG RAN WG1 Meeting #90 R1-1712481, Aug. 25, 2017 (Aug. 25, 2017), sections 2-4.
(Continued)

*Primary Examiner* — John Pezzlo
(74) *Attorney, Agent, or Firm* — Perkins Coie LLP

(57) ABSTRACT

Disclosed is a carrier selection method, a terminal device and a computer storage medium. The method comprises: running at least one process on at least one initial carrier, wherein different processes are run on the same or different initial carriers; selecting a first carrier for a target process in the at least one process, wherein the first carrier is the same as or different from the initial carrier; and bearing at least a part of data of the target process on the first carrier.

30 Claims, 4 Drawing Sheets

(51) Int. Cl.
*H04W 72/10* (2009.01)
*H04J 1/16* (2006.01)

(58) Field of Classification Search
USPC .................................. 370/252, 329, 430
See application file for complete search history.

(56) References Cited

U.S. PATENT DOCUMENTS

| | | | | |
|---|---|---|---|---|
| 2018/0295514 | A1* | 10/2018 | Brown | H04W 12/068 |
| 2018/0310158 | A1* | 10/2018 | Kimura | H04W 48/18 |
| 2019/0364492 | A1* | 11/2019 | Azizi | H04W 48/16 |

FOREIGN PATENT DOCUMENTS

| | | | |
|---|---|---|---|
| CN | 101345608 | A | 1/2009 |
| CN | 101588605 | B | 5/2011 |
| CN | 102244929 | B | 10/2013 |
| CN | 103458519 | A | 12/2013 |
| CN | 104412653 | A | 3/2015 |
| CN | 105323859 | A | 2/2016 |
| CN | 102724715 | B | 8/2016 |
| CN | 106537979 | A | 3/2017 |
| CN | 106900033 | A | 6/2017 |
| WO | 2017010774 | A1 | 1/2017 |
| WO | 2017150956 | A1 | 9/2017 |

OTHER PUBLICATIONS

International Search Report in the international application No. PCT/CN2017/101855, dated May 25, 2018.
First Office Action of the Chinese application No. 201780047891.8, dated Feb. 6, 2020.
Second Office Action of the Chinese application No. 201780047891.8, dated May 6, 2020.
English translation of the Written Opinion of the International Search Authority in the international application No. PCT/CN2017/101855, dated May 25, 2018.

* cited by examiner

CARRIER SELECTING METHOD, TERMINAL DEVICE, AND COMPUTER STORAGE MEDIUM

CROSS-REFERENCE TO RELATED APPLICATIONS

The present application is a U.S. National Phase Entry of International PCT Application No. PCT/CN2017/101855 filed on Sep. 15, 2017, entitled "CARRIER SELECTING METHOD, TERMINAL DEVICE, AND COMPUTER STORAGE MEDIUM", the content of which is hereby incorporated by reference in its entirety.

TECHNICAL FIELD

The disclosure relates to the technical field of Vehicle To Everything (V2X), and particularly to a method and terminal device for carrier selection and a computer storage medium.

BACKGROUND

V2X system is a Sidelink (SL) transmission technology based on Long Term Evolution Device to Device (LTE D2D). Unlike a conventional LTE system adopting a manner of receiving or sending communication data through a base station, a V2X system adopts a D2D communication manner and thus is higher in spectrum efficiency and lower in transmission delay.

In 3GPP Rel-14, a V2X technology is standardized, and two transmission modes are defined: a mode 3 and a mode 4. In the mode 4, a vehicle terminal adopts a sensing and reservation transmission manner. The vehicle terminal acquires an available transmission resource set in a resource pool in the sensing manner, and the terminal randomly selects a resource from the set for data transmission. Since a service in a V2X system is periodic, a terminal usually adopts a semi-persistent transmission manner, namely the terminal, after selecting a transmission resource, may using the resource in multiple transmission cycles continuously, so that probabilities of resource reselection and resource conflict are reduced. The terminal may contain information of reserving a resource for next transmission in control information transmitted this time such that another terminal may detect the control information for a user equipment (UE) to determine whether a resource is reserved and used by the UE, to achieve the purpose of reducing resource conflicts.

However, such a manner for selecting a resource for a terminal is no longer adapted to more application scenarios and particularly not adapted properly to a scenario that a terminal selects a carrier from multiple carriers.

SUMMARY

For solving the technical problem, embodiments of the disclosure provide a method for carrier selection, a terminal device and a computer storage medium.

The embodiments of the disclosure provide a method for carrier selection, which may be applied to a terminal device and include the following operations.

At least one process is run on one or more initial carriers, different ones of the processes run on a same one or different ones of the initial carriers.

A first carrier is selected for a target process in the at least one process, the first carrier is one of the initial carriers, or different from any of the initial carriers.

At least part of data of the target process is carried on the first carrier.

The embodiments of the disclosure provide a terminal device, which includes a communication unit and a selection unit.

The communication unit is configured to run at least one process on one or more initial carriers, different ones of the processes run on a same one or different ones of the initial carriers.

The selection unit is configured to select a first carrier for a target process in the at least one process, the first carrier is one of the initial carriers, or different from any of the initial carriers.

The communication unit is further configured to carry at least part of data of the target process on the first carrier.

The embodiments of the disclosure provide a terminal device, which includes a processor and a memory configured to store a computer program capable of running on the processor.

The processor is configured to run the computer program to execute the steps of the abovementioned method.

The embodiments of the disclosure provide a computer storage medium having computer-executable instructions stored thereon, the computer-executable instructions, when being executed, implement the method of carrier selection of the embodiments of the disclosure.

According to the technical solutions of the embodiments of the disclosure, a carrier is reselected for a target process in multiple processes in a scenario that the multiple processes run on multiple carriers, so that carrier reselection can be implemented for any process in the multiple processes run by the terminal device independently, and more processing scenarios are provided for carrier selection of the terminal device.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Embodiment 1

Figure 1:
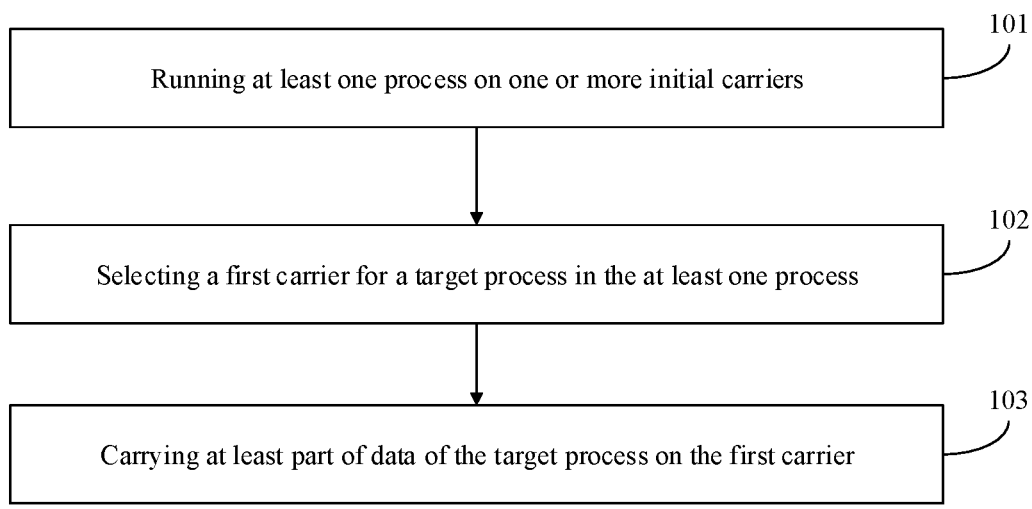
FIG. 1 is a flowchart of a carrier selection method according to an embodiment of the disclosure.

The application provides a method for carrier selection, which is applied to a terminal device and, as shown in FIG. 1, includes the following operations.

In 101, at least one process is run on one or more initial carriers, different ones of the processes run on a same one or different ones of the initial carriers.

In 102, a first carrier is selected for a target process in the at least one process, the first carrier is one of the initial carriers, or different from any of the initial carriers.

In 103, at least part of data of the target process is carried on the first carrier.

Here, the at least one process refers to multiple processes capable of being run by the terminal device at present. That is, at least one may refer to two or more.

In addition, carrier selection may be performed for each process independently. For example, a UE runs four processes A, B, C and D independently on different carriers, A and B run on a first carrier and C and D run on a second carrier, and in such case, carrier selection is performed for the four processes A, B, C and D respectively.

It is also to be noted that, in the embodiment provided in the application, for each process, carrier selection is not performed when a reserved resource is used and carrier selection may be performed when resource reselection is required.

The following triggering manners may be adopted to trigger a specific process to perform resource reselection.

A first manner: whether to trigger a process (as a target process) to perform resource reselection may be determined based on a length of a resource reselection timer.

That is, for each of the at least one process whether the process requires resource selection is determined based on a resource reselection timer corresponding to the process; and responsive to determining one of the at least one process requires resource reselection, the process is determined to be the target process.

For example, at time 1, A requires resource reselection according to an original sensing and reservation mechanism, but reselection timer corresponding to B/C/D has yet not expired, resource reselection time has yet not come. In such case, carrier reselection may be performed for A, and carrier reselection is not performed for B/C/D. That is, a reselection timer corresponding to the process A expired, and the process A is presently determined to be a target process.

A Second Manner

Whether there is a carrier for which resource pool configuration or resource pool reconfiguration is performed is determined.

If there is a carrier for which resource pool configuration or resource pool reconfiguration is performed, at least one process on the carrier is selected to be a target process.

When resource pool configuration or resource pool reconfiguration is performed for the carrier, all processes on the carrier may be determined to be target processes, that is, carrier reselection is performed for all the processes.

Of course, if a configured resource pool is reduced after the configuration or reconfiguration is performed for the carrier, a process may be selected from the processes run on the carrier as a target process. A selection manner may be selection according to a practical condition and may also be random selection. Selection according to the practical condition may refer to selecting a process with a maximum data size or selecting a process with a minimum data size, and a specific rule may be limited according to a practical processing condition. Exhaustions are omitted in the embodiment.

A Third Manner

Whether there is a carrier on which at least one process is uncapable of carrying a presently running data size is determined.

If YES, a target process is selected from the at least one process running on the carrier.

That is, a determination may be made according to data sizes of the processes presently run on the carrier, and if a data size of a process suddenly increases, the carrier may not bear all the processes that are presently run.

In such case, it is necessary to select one or more processes from multiple processes that are presently borne as target processes for resource reselection.

A fourth manner

If there is continuously no transmission or retransmission on a carrier in a preset time, a process on the carrier is selected to be a target process.

A fifth manner

If no data transmission is performed on a carrier in N continuous transmission times, a process on the carrier is selected to be a target process, N is an integer. N may be set according to a practical condition, for example, 10 continuous transmission times or 20 transmission times. N may be flexibly regulated. Exhaustions are omitted in the embodiment.

A sixth manner

A data size carried by at least one process on at least one carrier is acquired.

If the data size carried by the at least one process on the at least one carrier is smaller than a service data size, a target process is selected from the at least one process borne on the at least one carrier.

That is, unlike the multiple abovementioned triggering manners, in this manner, a determination is made based on a sum of data sizes presently carried on multiple carriers, and if the sum of data sizes carried by multiple processes on the multiple carriers is smaller than the service data size, it is necessary to select one or more processes from the multiple processes run on the multiple carriers to be target processes and further perform resource reselection for the selected target processes.

Furthermore, the operation that the first carrier is selected for the target process in the at least one process includes the following operations: a priority corresponding to the target process is acquired; a carrier set corresponding to the priority is determined based on the priority corresponding to the target process, different priorities correspond to different carrier sets; and the first carrier is selected from the carrier set.

For a process (for example, A) for which carrier reselection is performed, the priorities of the data in a buffer may be considered during carrier reselection, and if there are data with high priorities and data with low priorities, carrier selection is performed according to the data with the high priorities. That is, different carrier sets are available for different priorities. It can be understood that part of carriers in different carrier sets may be the same but a carrier set inevitably includes at least one carrier that is different from the carriers included in any other carrier set.

The operation that at least part of the data of the target process is carried on the first carrier includes the following operations.

It is determined to carry all or part of the data of the target process on the first carrier based on a data carrying condition of the first carrier. The data carrying condition at least includes at least one of: a representation about whether the carrier is capable of carrying all the data of the process; or, a priority of the carrier.

Processing scenarios after the first carrier with different data carrying conditions is selected for the target process will be described below.

A first scenario: when the data carrying condition of the first carrier represents that all the data of the target process is capable of being carried, all the data of the target process is carried on the first carrier.

This scenario may further be divided into two sub scenarios.

A first sub scenario: when the data carrying condition of the first carrier represents that all the data of the target process is capable of being carried and the number of processes capable of being run by the terminal device on the first carrier is less than a threshold, a new process is generated on the first carrier to carry all the data of the target process.

That is, when a carrier, for example, a carrier X, is selected for a process (for example, A) for which carrier reselection is performed, the carrier X may be the abovementioned first carrier or second carrier, or may also be different from both the first carrier and the second carrier.

If the carrier X may carry all data in the buffer of the process A of the terminal device (according to a V2X protocol in Rel-14, a bearable data limit of each UE on each carrier is calculated according to the UE's speed, a Channel Busy Ratio (CBR) and a data priority) and the number of processes of the UE on the carrier is less than a maximum limit (for example, each UE may run at most two processes on a carrier, but the UE has already run only 0 or 1 process), the carrier X is selected for the process A, and a new process is generated.

It is to be noted that a data size capable of being carried on each carrier may be calculated and determined according to a related parameter of the terminal device and a parameter such as priorities corresponding to data of different processes.

In addition, the threshold may be set for the numbers of processes capable of being run by different terminal devices on different carriers. Specifically, the threshold may be set according to a practical condition, for example, 2 or more. Exhaustions are omitted in the embodiment.

A Second Sub Scenario

When the data carrying condition of the first carrier represents that all the data of the target process is capable of being carried and the number of the processes capable of being run by the terminal device on the first carrier is equal to the threshold, an adjustable process is selected from the processes running on the first carrier other than the target process, and a reserved resource for the adjustable process is adjusted to carry all data of the adjustable process and all the data of the target process in the adjusted reserved resource.

If the carrier is capable of carrying all the data in the buffer but the number of the processes of the UE on the carrier is equal to the maximum limit (for example, each UE may run at most two processes on each carrier, but the UE has already run two processes), the carrier X is selected for the process A.

Or, a process existing on the carrier is interrupted, for example, the process C existing on the carrier, a reserved resource for C is increased to bear data of the two processes A and C.

Or, when the data carrying condition of the first carrier represents that all the data of the target process is capable of being carried and the number of the processes capable of being run by the terminal device on the first carrier is equal to the threshold, all the data of the target process is sent in form of a single data packet on the first carrier.

That is, a single-data-packet sending manner is selected for the carrier, namely resource reservation (i.e., multi-data-packet sending) is abandoned.

A Second Scenario

When the data carrying condition of the first carrier represents that all the data of the target process may not be carried, part of the data of the target process is carried on the first carrier.

In this scenario, the specific part of the data, to be carried on the first carrier, of the target process may be randomly selected. Exhaustions are omitted in the embodiment.

The operation that part of the data of the target process is carried on the first carrier further includes operations that carrier reselection is performed for the remaining data of the target process other than the part of the data, to obtain a second carrier, and the remaining data of the target process is carried on the second carrier.

That is, if the carrier may not carry all the data in the buffer, part of the resource for the process A is reselected to the carrier X, and data allocation is performed according to the abovementioned process.

For the remaining data in the buffer, resource reselection is performed (the step is repeated for the data in the buffers), and carrier and data allocation are performed according to the abovementioned process.

A Third Scenario

When a priority of the target process is matched with a priority of the first carrier, all the data of the target process is carried on the first carrier, otherwise part of the data of the target process is carried on the first carrier.

It is to be noted that the priority of the target process may be set according to a practical condition. That the priority of the target process is matched with the priority of the first carrier means that the priority of the target process is in a priority range of the first carrier. For example, if the priority of the target process is 1 and the first carrier may have one or more priorities, namely the first carrier may have priorities 1, 2 and 3, the priority of the target process is in the priority range of the first carrier. In such case, all the data of the target process may be carried on the first carrier. On the contrary, the part of the data of the target process may be carried on the first carrier, and the remaining part of the data may be carried on another carrier in a manner the same as that in the abovementioned scenario.

In this scenario, the priority of the target process is the same as or different from the priority of the target process mentioned previously in the embodiment. The priority of the target process may be used to determine the first carrier previously, and may also be used to determine whether all the data may be transmitted on the first carrier in this scenario.

In addition, the priority of the target process may also consist of multiple sub-priority parameters. For example, during carrier selection, a carrier selection sub-priority may be adopted for processing, and a data carrying sub-priority may be adopted for processing in this scenario.

Of course, there may also be another implementation mode. Exhaustions are omitted in the embodiment.

A Fourth Scenario

When the data carrying condition of the first carrier represents that all the data of the target process is capable of being carried and the priority of the target process is matched with the priority of the first carrier, all the data of the target process is carried on the first carrier, otherwise part of the data of the target process is carried on the first carrier.

This scenario may be understood as a set of the conditions in the abovementioned scenarios. That is, under the case that the first carrier may carry all the data and the priorities are matched, all the data of the target process is carried, otherwise part of the data of the target process is carried on the carrier and the remaining data is carried on another carrier.

Like the third scenario, in this scenario, the priority of the target process is the same as or different from the priority of the target process previously mentioned in the embodiment. The priority of the target process may be used to determine the first carrier previously, and may also be used to determine whether all the data may be transmitted on the first carrier in this scenario.

In addition, the priority of the target process may also consist of multiple sub-priority parameters. For example, during carrier selection, the carrier selection sub-priority may be adopted for processing, and the data carrying sub-priority may be adopted for processing in this scenario.

Of course, there may also be another implementation mode. Exhaustions are omitted in the embodiment.

Figure 2:
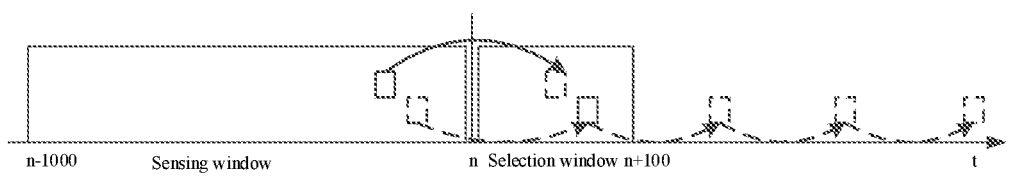
FIG. 2 is a schematic diagram of a resource allocation scenario.

A sensing and reservation manner in a conventional art may refer to FIG. 2. When a new data packet arrives at time n and resource selection is required, a terminal may perform resource selection in milliseconds [n+T1, n+T2] according to a sensing result of the past 1 second, where T1=4 and 20<=T2<=100.

A process that the terminal performs resource selection in a selection window is as follows. The terminal determines all available resources in the selection window as a set A, and the terminal executes an exclusion operation on the resources in the set A: if the terminal obtains no sensing result for some subframes in a sensing window, the resources, corresponding to these subframes, in the selection window are excluded; and if the terminal detects a Physical Sidelink Control Channel (PSCCH) in the sensing window, corresponding PSCCH Reference Signal Received Power (RSRP) is greater than a threshold and a next transmission resource reserved in control information collides with a resource for data to be sent by a UE, the UE excludes the resource in the set A.

The terminal performs Sidelink-Received Signal Strength Indicator (S-RSSI) detection on the left resources in the set A, sequences them according to energy and puts 20% (relative to the number of the resources in the set A) of the resources with lowest energy in a set B. The terminal equiprobably selects a resource from the set B for data transmission.

According to the solution of the conventional art, a multi-carrier scenario extended in Rel-15 is not considered. With adoption of the technical solution provided in the embodiment, carrier reselection is performed for a target process in multiple processes in a scenario that the multiple processes run on multiple carriers, so that an process that carrier reselection is performed independently for any process in the multiple processes run by the terminal device may be implemented, and more processing scenarios are provided for carrier selection of the terminal device.

Embodiment 2

Figure 3:
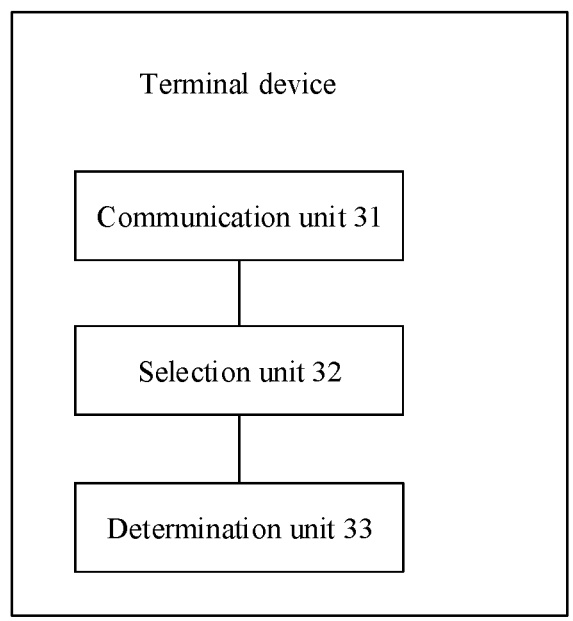
FIG. 3 is a composition structure diagram of a terminal device according to an embodiment of the disclosure.

The application provides a terminal device, which, as shown in FIG. 3, includes a communication unit 31 and a selection unit 32.

The communication unit 31 is configured to run at least one process on one or more initial carriers, different ones of the processes run on a same one or different ones of the initial carriers.

The selection unit 32 is configured to select a first carrier for a target process in the at least one process, the first carrier is one of the initial carriers, or different from any of the initial carriers.

The communication unit 31 is further configured to carry at least part of data of the target process on the first carrier.

Here, the at least one process refers to multiple processes capable of being run by the terminal device at present. That is, at least one may refer to two or more.

In addition, carrier selection may be performed for each process independently. For example, a UE runs four processes A, B, C and D independently on different carriers, A and B run on a first carrier and C and D run on a second carrier, and in such case, carrier selection is performed for the four processes A, B, C and D respectively.

It is also to be noted that, in the embodiment provided in the application, for each process, carrier selection is not performed when a reserved resource is used and carrier selection may be performed when resource reselection is required.

The following triggering manners may be adopted to trigger a specific process to perform resource reselection.

A first manner, whether to trigger a process (as a target process) to perform resource reselection may be determined based on a length of a resource reselection timer.

Specifically, the terminal device further includes a determination unit 33.

The determination unit 33 is configured to: for each of the at least one process, determine, based on a resource reselection timer corresponding to the process, whether the process requires resource selection and, responsive to determining one of the at least one process requires resource reselection, determine the process to be the target process.

For example, at time 1, A requires resource reselection according to an original sensing and reservation mechanism, but reselection timer corresponding to B/C/D has yet not expired, resource reselection time has yet not come. In such case, carrier reselection may be performed for A, and carrier reselection is not performed for B/C/D. That is, a reselection timer of the process A expired, and the process A is presently determined to be a target process.

A Second Manner Whether there is a carrier for which resource pool configuration or resource pool reconfiguration is performed is determined.

If there is a carrier for which resource pool configuration or resource pool reconfiguration is performed, at least one process on the carrier is selected to be a target process.

When resource pool configuration or resource pool reconfiguration is performed for the carrier, all processes on the carrier may be determined to be target processes, that is, carrier reselection is performed for all the processes.

Of course, if a configured resource pool is reduced after the reconfiguration or configuration is performed for the carrier, a process may be selected from the processes run on the carrier to be a target process. A selection manner may be selection according to a practical condition and may also be random selection. Selection according to the practical condition may refer to selecting a process with a maximum data size or selecting a process with a minimum data size, and a specific rule may be limited according to a practical processing condition. Exhaustions are omitted in the embodiment.

A Third Manner

Whether there is a carrier on which at least one process is uncapable of carrying a presently running data size is determined.

If YES, a target process is selected from the at least one process running on the carrier.

That is, a determination may be made according to data sizes of the processes presently run on the carrier, and if a data size of a process suddenly increases, the carrier may not bear all the processes that are presently run.

In such case, it is necessary to select one or more processes from multiple processes that are presently borne to be target processes for resource reselection.

A Fourth Manner

If there is continuously no transmission or retransmission on a carrier in a preset time, a process on the carrier is selected to be a target process.

A Fifth Manner

If no data transmission is performed on a carrier in N continuous transmission times, a process on the carrier is selected to be a target process, N is an integer. N may be set according to a practical condition, for example, 10 continuous transmission times or, 20 transmission times. N may be flexibly regulated. Exhaustions are omitted in the embodiment.

A Sixth Manner

A data size carried by at least one process on at least one carrier is acquired.

If the data size carried by the at least one process on the at least one carrier is smaller than a service data size, a target process is selected from the at least one process borne on the at least one carrier.

That is, unlike the multiple abovementioned triggering manners, in this manner, a determination is made based on a sum of data sizes presently carried on multiple carriers. That is, if the sum of data sizes carried by multiple processes on the multiple carriers is greater than a data size threshold, it is necessary to select one or more processes from the multiple processes run on the multiple carriers as target processes and further perform resource reselection for the selected target processes.

Furthermore, the selection unit is configured to acquire a priority corresponding to the target process.

A carrier set corresponding to the priority is determined based on the priority corresponding to the target process, different priorities correspond to different carrier sets.

The first carrier is selected from the carrier set.

For a process (for example, A) for which carrier reselection is performed, the priorities of data in a buffer may be considered during carrier reselection, and if there is data with high priorities and data with low priorities, carrier selection is performed according to the data with the high priorities. That is, if different carrier sets are available for different priorities, it can be understood that part of carriers in different carrier sets may be the same but a carrier set inevitably includes at least one carrier that is different from the carriers included in any other carrier set.

The communication unit is further configured to determine to carry all or part of the data of the target process on the first carrier based on a data carrying condition of the first carrier. The data carrying condition may be understood as a condition of data that has been carried on the carrier at present, or, may be understood as a condition of data that may still be carried on the carrier at present.

Processing scenarios after the first carrier with different data carrying conditions is selected for the target process will be described below.

A first scenario: when the data carrying condition of the first carrier represents that all the data of the target process is capable of being carried, all the data of the target process is carried on the first carrier.

This scenario may further be divided into two sub scenarios.

A first sub scenario: when the data carrying condition of the first carrier represents that all the data of the target process is capable of being carried and the number of processes capable of being run by the terminal device on the first carrier is less than a threshold, a new process is generated on the first carrier to carry all the data of the target process.

That is, when a carrier, for example, a carrier X, is selected for a process (for example, A) for which carrier reselection is performed, the carrier X may be the abovementioned first carrier or second carrier, or may also be different from both the first carrier and the second carrier.

If the carrier X may bear all data in a buffer of the process A of the terminal device (according to a V2X protocol in Rel-14, a bearable data limit of each UE on each carrier is calculated according to the UE's speed, a CBR and a data priority) and the number of processes of the UE on the carrier is less than a maximum limit (for example, each UE may run at most two processes on a carrier, but the UE has already run only 0 or 1 process), the carrier X is selected for the process A, and a new process is generated.

It is to be noted that a data size capable of being carried on each carrier may be calculated and determined according to a related parameter of the terminal device and a parameter such as priorities corresponding to data of different processes.

In addition, the threshold may be set for the numbers of processes capable of being run by different terminal devices on different carriers. Specifically, the threshold may be set according to a practical condition for example, 2 or more. Exhaustions are omitted in the embodiment.

A Second Sub Scenario

When the data carrying condition of the first carrier represents that all the data of the target process is capable of being carried and the number of the processes capable of being run by the terminal device on the first carrier is equal to the threshold, an adjustable process is selected from the other processes, except the target process, run on the first carrier, and a reserved resource for the adjustable process is adjusted to carry all data of the adjustable process and all the data of the target process on the adjusted reserved resource.

If the carrier is capable of carrying all data in a buffer but the number of the processes of the UE on the carrier is equal to the maximum limit (for example, each UE may run at most two processes on each carrier, but the UE has already run two processes), the carrier X is selected for the process A.

Or, a process existing on the carrier is interrupted, for example, the process C exists, a reserved resource for C is increased to bear data of the two processes A and C.

Or, when the data carrying condition of the first carrier represents that all the data of the target process is capable of being carried and the number of processes capable of being run on the terminal device is equal to the threshold, all the data of the target process is sent in form of a single data packet on the first carrier.

That is, a single-data-packet sending manner is selected for the carrier, namely resource reservation (i.e., multi-data-packet sending) is abandoned.

A Second Scenario

When the data carrying condition of the first carrier represents that all the data of the target process is uncapable of being carried, part of the data of the target process is carried on the first carrier.

In this scenario, the specific part of the data, to be carried on the first carrier, of the target process may be randomly selected. Exhaustions are omitted in the embodiment.

The operation that part of the data of the target process is carried on the first carrier further includes the following operations.

Carrier reselection is performed for the remaining data of the target process other than the part of the data, to obtain a second carrier, and the remaining data of the target process is carried on the second carrier.

That is, if the carrier is uncapable of carrying all the data in the buffer, part of the resource for the process A is reselected to the carrier X, and data allocation is performed according to the abovementioned process.

For the remaining data in the buffer, resource reselection is performed (the step is repeated for the data in the buffer), and carrier and data allocation are performed according to the abovementioned process.

With adoption of the technical solution provided in the embodiment, a carrier is reselected for a target process in multiple processes in a scenario that the multiple processes run on multiple carriers, so that processing of carrier reselection for any process in the multiple processes run by the terminal device may be independently implemented, and more processing scenarios are provided for carrier selection of the terminal device.

A Third Scenario

When a priority of the target process is matched with a priority of the first carrier, all the data of the target process is carried on the first carrier, otherwise part of the data of the target process is carried on the first carrier.

It is to be noted that the priority of the target process may be set according to a practical condition. That the priority of the target process is matched with the priority of the first carrier means that the priority of the target process is in a priority range of the first carrier. For example, if the priority of the target process is 1 and the first carrier may have one or more priorities, namely the first carrier may have priorities 1, 2 and 3, the priority of the target process is in the priority range of the first carrier. In such case, all the data of the target process may be carried on the first carrier. On the contrary, the part of the data of the target process may be carried, and the remaining part of the data may be carried on another carrier in a manner the same as that in the abovementioned scenario.

In this scenario, the priority of the target process is the same as or different from the priority of the target process mentioned previously in the embodiment. The priority of the target process may be used to determine the first carrier previously, and may also be used to determine whether all the data may be transmitted on the first carrier in this scenario.

In addition, the priority of the target process may also consist of multiple sub-priority parameters. For example, during carrier selection, the carrier selection sub-priority may be adopted for processing, and the data carrying sub-priority may be adopted for processing in this scenario.

Of course, there may also be another implementation mode. Exhaustions are omitted in the embodiment.

A Fourth Scenario

When the data carrying condition of the first carrier represents that all the data of the target process is capable of being carried and the priority of the target process is matched with the priority of the first carrier, all the data of the target process is carried on the first carrier, otherwise part of the data of the target process is carried on the first carrier.

This scenario may be understood as a set of the conditions in the abovementioned scenarios. That is, under the circumstance that the first carrier may carry all the data and the priorities are matched, all the data of the target process is carried, otherwise part of the data of the target process is carried on the carrier and the remaining data is carried on another carrier.

Like the third scenario, in this scenario, the priority of the target process is the same as or different from the priority of the target process mentioned previously in the embodiment. The priority of the target process may be configured to determine the first carrier before, and may also be used to determine whether all the data may be transmitted on the first carrier in this scenario.

In addition, the priority of the target process may also consist of multiple sub-priority parameters. For example, during carrier selection, the carrier selection sub-priority may be adopted for processing, and the data carrying sub-priority may be adopted for processing in this scenario.

Of course, there may also be another implementation mode. Exhaustions are omitted in the embodiment.

Figure 4:
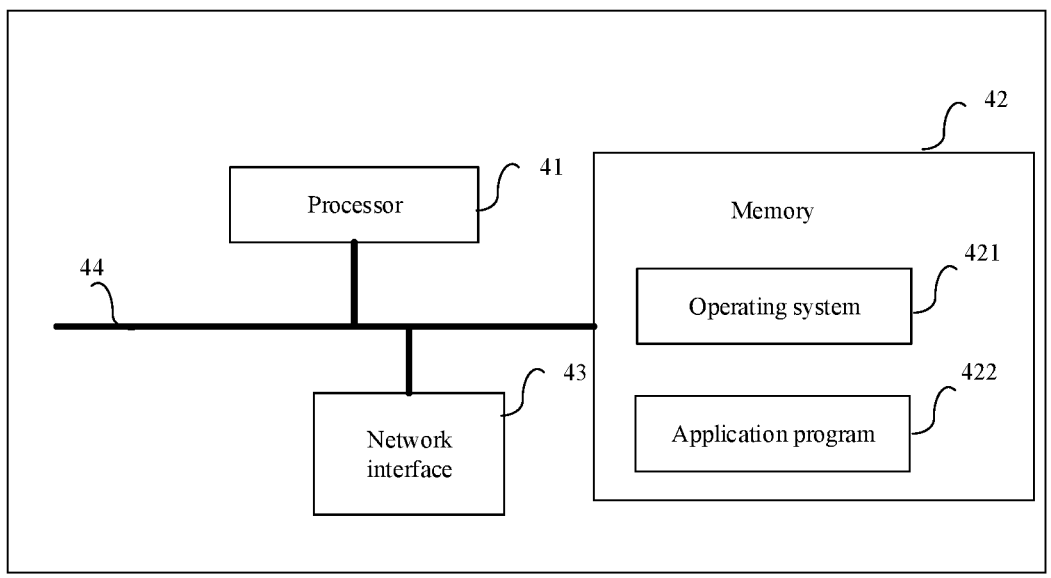
FIG. 4 is a hardware structure diagram of a terminal device according to an embodiment of the disclosure.

The embodiments of the invention also provide a hardware composition architecture of a terminal device, which, as shown in FIG. 4, includes at least one processor 41, a memory 42 and at least one network interface 43. Each component is coupled together through a bus system 44. It may be understood that the bus system 44 is configured to implement connection communication between these components. The bus system 84 includes a data bus and further includes a power bus, a control bus and a state signal bus. However, for clear description, various buses in FIG. 10 are marked as the bus system 44.

It may be understood that the memory 42 in the embodiment of the disclosure may be a volatile memory or a nonvolatile memory, or may include both the volatile and nonvolatile memories.

In some implementation modes, the memory 42 stores the following elements, executable modules or data structures, or a subset thereof or an extended set thereof:

an operating system 421 and an application program 422.

The processor 41 is configured to run at least one process on one or more initial carriers, different ones of the processes run on a same one or different ones of the initial carriers, select a first carrier for a target process in the at least one process, the first carrier is one of the initial carriers, or different from any of the initial carriers, and carry at least part of data of the target process on the first carrier.

The application also provides a computer storage medium having computer programs stored thereon, the computer program, when being executed by a processor, implement the steps of the method in embodiment 1, which will not be elaborated herein.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium having computer programs stored thereon, the computer programs are configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for carrier selection, applied to a terminal device and comprising:
running at least one process on one or more initial carriers, wherein different ones of the processes run on a same one or different ones of the initial carriers;
selecting a first carrier for a target process in the at least one process, wherein the first carrier is one of the initial carriers, or different from any of the initial carriers; and
determining, based on a data carrying condition of the first carrier, to carry all or part of data of the target process on the first carrier,
wherein the data carrying condition comprises at least one of:
a representation about whether the first carrier is capable of carrying all the data of the target process; or,
a priority of the first carrier.

2. The method of claim 1, wherein determining, based on the data carrying condition of the first carrier, to carry all or part of the data of the target process on the first carrier comprises:
when the data carrying condition of the first carrier represents that all the data of the target process is capable of being carried, carrying all the data of the target process on the first carrier, otherwise carrying part of the data of the target process on the first carrier.

3. The method of claim 2, wherein carrying part of the data of the target process on the first carrier further comprises:
performing carrier reselection for remaining data of the target process other than the part of the data, to obtain a second carrier, and carrying the remaining data of the target process on the second carrier.

4. The method of claim 2, wherein carrying all the data of the target process on the first carrier when the data carrying condition of the first carrier represents that all the data of the target process is capable of being carried comprises:
when the data carrying condition of the first carrier represents that all the data of the target process is capable of being carried and a number of processes capable of being run by the terminal device on the first carrier is less than a threshold, generating a new process on the first carrier to carry all the data of the target process.

5. The method of claim 2, wherein carrying all the data of the target process on the first carrier when the data carrying condition of the first carrier represents that all the data of the target process is capable of being carried comprises:
when the data carrying condition of the first carrier represents that all the data of the target process is capable of being carried and a number of processes capable of being run by the terminal device on the first carrier is equal to a threshold, selecting an adjustable process from processes running on the first carrier other than the target process, and adjusting a reserved resource for the adjustable process to carry all data of the adjustable process and all the data of the target process in the adjusted reserved resource.

6. The method of claim 2, wherein carrying all the data of the target process on the first carrier when the data carrying condition of the first carrier represents that all the data of the target process is capable of being carried comprises:
when the data carrying condition of the first carrier represents that all the data of the target process is capable of being carried and a number of processes capable of being run by the terminal device on the first carrier is equal to a threshold, sending all the data of the target process in form of a single data packet on the first carrier.

7. The method of claim 1, wherein determining based on the data carrying condition of the first carrier, to carry all or part of the data of the target process on the first carrier comprises:
when a priority of the target process is matched with a priority of the first carrier, carrying all the data of the target process on the first carrier, otherwise carrying part of the data of the target process on the first carrier.

8. The method of claim 1, wherein determining, based on the data carrying condition of the first carrier, to carry all or part of the data of the target process on the first carrier comprises:
when the data carrying condition of the first carrier represents that all the data of the target process is capable of being carried and a priority of the target process is matched with a priority of the first carrier, carrying all the data of the target process on the first carrier, otherwise carrying part of the data of the target process on the first carrier.

9. The method of claim 1, further comprising:
for each of the at least one process, determining, based on a resource reselection timer corresponding to the process, whether the process requires resource reselection; and
responsive to determining that one of the at least one process requires resource reselection, determining the process to be the target process.

10. The method of claim 1, further comprising:
determining whether there is a carrier for which resource pool configuration or resource pool reconfiguration is performed; and
if there is a carrier for which the resource pool configuration or the resource pool reconfiguration is performed, selecting at least one process on the carrier to be the target process.

11. The method of claim 1, further comprising:
determining whether there is a carrier on which at least one process is incapable of carrying a presently running data size; and
if YES, selecting the target process from the at least one process running on the carrier.

12. The method of claim 1, further comprising:
acquiring a data size carried by at least one process on at least one carrier; and
if the data size carried by the at least one process on the at least one carrier is smaller than a service data size, selecting the target process from the at least one process borne on the at least one carrier.

13. The method of claim 1, further comprising:
if there is continuously no transmission or retransmission on a carrier in a preset time, selecting a process on the carrier to be the target process.

14. The method of claim 1, further comprising:
if no data transmission is performed on a carrier in N continuous transmission times, selecting a process on the carrier to be the target process, N being an integer.

15. The method of claim 1, wherein selecting the first carrier for the target process in the at least one process comprises:
acquiring a priority corresponding to the target process;
determining a carrier set corresponding to the priority based on the priority corresponding to the target process, wherein different priorities correspond to different carrier sets; and
selecting the first carrier from the carrier set.

16. A terminal device, comprising a processor and a memory configured to store a computer program capable of running in the processor,
wherein the processor is configured to run the computer program to execute the following operations:
running at least one process on one or more initial carriers, wherein different ones of the processes run on a same one or different ones of the initial carriers;
selecting a first carrier for a target process in the at least one process, wherein the first carrier is one of the initial carriers, or different from any of the initial carriers; and
determining, based on a data carrying condition of the first carrier, to carry all or part of data of the target process on the first carrier,
wherein the data carrying condition comprises at least one of:
a representation about whether the first carrier is capable of carrying all the data of the target process; or,
a priority of the first carrier.

17. The terminal device according to claim 16, wherein the processor is configured to run the computer program to:
when the data carrying condition of the first carrier represents that all the data of the target process is capable of being carried, carry all the data of the target process on the first carrier, otherwise carry part of the data of the target process on the first carrier.

18. The terminal device according to claim 17, wherein the processor is configured to run the computer program to:
perform carrier reselection for remaining data of the target process other than the part of the data, to obtain a second carrier, and carry the remaining data of the target process on the second carrier.

19. The terminal device according to claim 17, wherein the processor is configured to run the computer program to:
when the data carrying condition of the first carrier represents that all the data of the target process is capable of being carried and a number of processes capable of being run by the terminal device on the first carrier is less than a threshold, generate a new process on the first carrier to carry all the data of the target process.

20. The terminal device according to claim 17, wherein the processor is configured to run the computer program to:
when the data carrying condition of the first carrier represents that all the data of the target process is capable of being carried and a number of processes capable of being run by the terminal device on the first carrier is equal to a threshold, select an adjustable process from processes running on the first carrier other than the target process, and adjust a reserved resource for the adjustable process to carry all data of the adjustable process and all the data of the target process in the adjusted reserved resource.

21. The terminal device according to claim 17, wherein the processor is configured to run the computer program to:
when the data carrying condition of the first carrier represents that all the data of the target process is capable of being carried and a number of processes capable of being run by the terminal device on the first carrier is equal to a threshold, send all the data of the target process in form of a single data packet on the first carrier.

22. The terminal device according to claim 16, wherein the processor is configured to run the computer program to:
when a priority of the target process is matched with a priority of the first carrier, carry all the data of the target process on the first carrier, otherwise carry part of the data of the target process on the first carrier.

23. The terminal device according to claim 16, wherein the processor is configured to run the computer program to:
when the data carrying condition of the first carrier represents that all the data of the target process is capable of being carried and a priority of the target process is matched with a priority of the first carrier, carry all the data of the target process on the first carrier, otherwise carry part of the data of the target process on the first carrier.

24. The terminal device according to claim 16, wherein the processor is configured to run the computer program to:
for each of the at least one process, determine, based on a resource reselection timer corresponding to the process, whether the process requires resource reselection; and
responsive to determining that one of the at least one process requires resource reselection, determine the process to be the target process.

25. The terminal device according to claim 16, wherein the processor is configured to run the computer program to:
determine whether there is a carrier for which resource pool configuration or resource pool reconfiguration is performed; and
if there is a carrier for which the resource pool configuration or the resource pool reconfiguration is performed, select at least one process on the carrier to be the target process.

26. The terminal device according to claim 16, wherein the processor is configured to run the computer program to:
determine whether there is a carrier on which at least one process is incapable of carrying a presently running data size; and
if YES, select the target process from the at least one process running on the carrier.

27. The terminal device according to claim 16, wherein the processor is configured to run the computer program to:
acquire a data size carried by at least one process on at least one carrier; and
if the data size carried by the at least one process on the at least one carrier is smaller than a service data size, select the target process from the at least one process borne on the at least one carrier.

28. The terminal device according to claim 16, wherein the processor is configured to run the computer program to:
if there is continuously no transmission or retransmission on a carrier in a preset time, select a process on the carrier to be the target process.

29. The terminal device according to claim 16, wherein the processor is configured to run the computer program to:
if no data transmission is performed on a carrier in N continuous transmission times, select a process on the carrier to be the target process, N being an integer.

30. The terminal device according to claim 16, wherein the processor is configured to run the computer program to:
acquire a priority corresponding to the target process;

determine a carrier set corresponding to the priority based on the priority corresponding to the target process, wherein different priorities correspond to different carrier sets; and select the first carrier from the carrier set.

* * * * *